(12) United States Patent
Long

(10) Patent No.: US 10,172,494 B2
(45) Date of Patent: Jan. 8, 2019

(54) METHOD FOR SEMI-AUTOMATIC FOOD COOKING

(71) Applicant: Kete Long, Ridgefield, CT (US)

(72) Inventor: Kete Long, Ridgefield, CT (US)

( * ) Notice: Subject to any disclaimer, the term of this patent is extended or adjusted under 35 U.S.C. 154(b) by 0 days.

(21) Appl. No.: 15/649,849

(22) Filed: Jul. 14, 2017

(65) Prior Publication Data
US 2018/0255956 A1    Sep. 13, 2018

Related U.S. Application Data

(60) Provisional application No. 62/509,176, filed on May 21, 2017, provisional application No. 62/502,755, filed on May 7, 2017, provisional application No. 62/470,230, filed on Mar. 11, 2017, provisional application No. 62/473,374, filed on Mar. 18, 2017.

(51) Int. Cl.
| | |
|---|---|
| *A47J 27/00* | (2006.01) |
| *A47J 37/06* | (2006.01) |
| *A47J 44/00* | (2006.01) |
| *A23L 5/10* | (2016.01) |
| *A47J 39/00* | (2006.01) |

(52) U.S. Cl.
CPC .............. *A47J 27/002* (2013.01); *A23L 5/10* (2016.08); *A47J 37/0623* (2013.01); *A47J 39/006* (2013.01); *A47J 44/00* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 3,928,045 | A | * 12/1975 | Tsunoda | A47J 27/18 221/150 HC |
| 4,381,442 | A | 4/1983 | Guibert | |
| 6,358,548 | B1 | 3/2002 | Ewald et al. | |
| 6,732,637 | B2 | 5/2004 | Artt | |
| 8,250,972 | B2 | * 8/2012 | Santoiemmo | B67D 1/0888 261/DIG. 7 |
| 8,334,004 | B2 | * 12/2012 | Liu | A23L 5/11 426/233 |

(Continued)

FOREIGN PATENT DOCUMENTS

| | | |
|---|---|---|
| CN | 101006833 A | 8/2007 |
| CN | 201055262 Y | 5/2008 |

(Continued)

OTHER PUBLICATIONS

International Searching Authority San Miguel, Eva Authorized Officer, Invitation to Pay Additional Fees and, Where Applicable, Protest Fee; PCT;US2018/021655, 13 pages, dated Jul. 9, 2018.

(Continued)

*Primary Examiner* — Viren A Thakur
*Assistant Examiner* — Thanh H Nguyen
(74) *Attorney, Agent, or Firm* — Sunstein Kann Murphy & Timbers LLP

(57) ABSTRACT

A semi-automatic food cooking apparatus comprising: a control unit; a communication unit; and a cooking compartment comprising: a cooking cartridge loading tray; a movable press; a movable cooking base; and a cooking cartridge lid guide.

9 Claims, 21 Drawing Sheets

(56) References Cited

U.S. PATENT DOCUMENTS

| | | | |
|---|---|---|---|
| 2011/0200726 A1* | 8/2011 | Tinkler | A47J 31/32 426/431 |
| 2011/0300270 A1 | 12/2011 | Koppens | |
| 2015/0060481 A1* | 3/2015 | Murray | B65D 85/8043 222/1 |
| 2015/0327717 A1* | 11/2015 | Burrows | A23F 3/18 99/295 |
| 2016/0150915 A1* | 6/2016 | Yu | A47J 36/32 99/327 |
| 2016/0286837 A1 | 10/2016 | Yu et al. | |
| 2016/0374486 A1 | 12/2016 | Yu et al. | |

FOREIGN PATENT DOCUMENTS

| | | |
|---|---|---|
| CN | 101683236 A | 3/2010 |
| CN | 203106753 U | 8/2013 |
| CN | 203263013 U | 11/2013 |
| ES | 2 431 488 | 11/2013 |
| KR | 10-2013-0118364 A | 10/2013 |
| KR | 10-2016-0059594 | 5/2016 |
| WO | WO 2005/073094 | 8/2005 |
| WO | WO 2005/073094 A2 | 8/2005 |
| WO | WO 2005/073094 A3 | 8/2005 |

OTHER PUBLICATIONS

International Searching Authority, International Search Report and the Written Opinion of the International Searching Authority; Application No. PCT/US2018/021655, 20 pages, dated Sep. 13, 2018.

\* cited by examiner

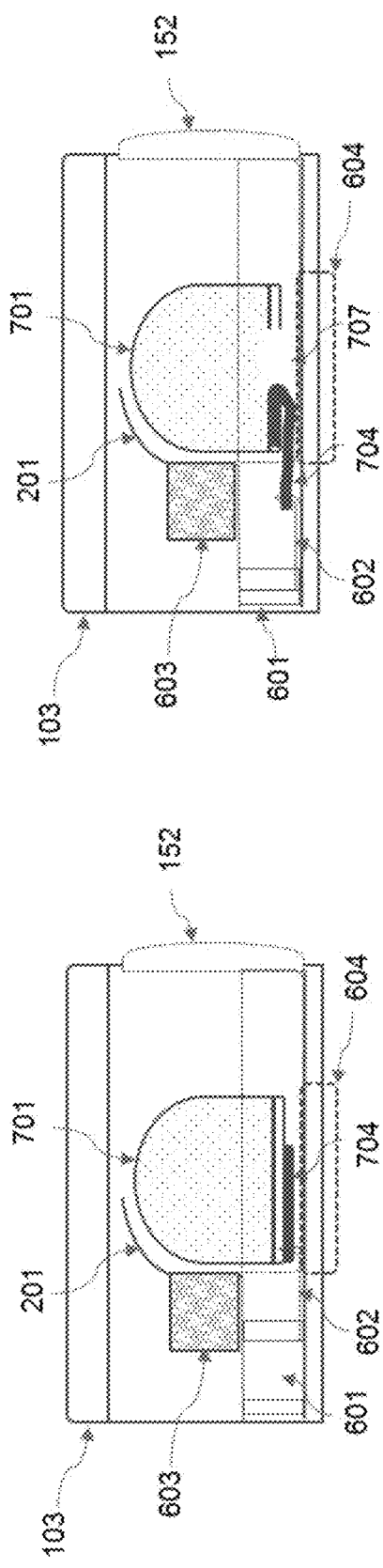
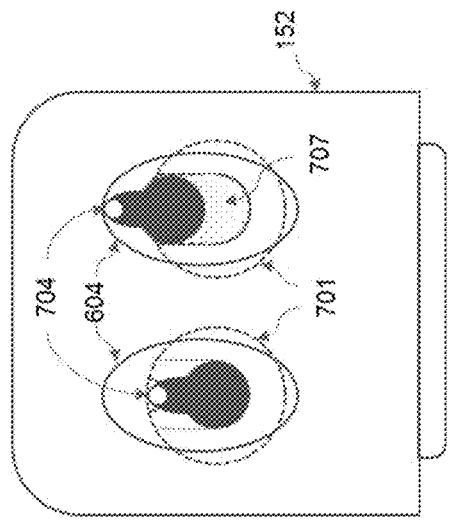
Fig. 17A
Fig. 17B
Fig. 17C

METHOD FOR SEMI-AUTOMATIC FOOD COOKING

The present application claims priority from the following provisional applications: Application No. 62/509,176 filed May 21, 2017, Application No. 62/502,755 filed May 7, 2017, Application No. 62/470,230 filed Mar. 11, 2017, and Application No. 62/473,374 filed Mar. 18, 2017, all of which list Kete Long as an inventor. All of the foregoing applications are incorporated herein by reference.

FIELD OF INVENTION

The present disclosure relates to systems and processes in kitchen automation, specifically, systems and methods to automate the preparation and cooking of various food items.

BACKGROUND

Food cooking is a tedious process that involves multiple steps and skills. Professional chefs can create delicious meals from creative uses of ingredients (e.g. herbs, spices, and condiments) and food items (e.g. meats, and vegetables). Consumers usually cook meals by following recipes.

Food cooking processes usually involves the following steps: (1) preparing food items into desired shapes and sizes, (2) assembling all food items and ingredients into desired amounts, and (3) cooking the prepared food items and ingredients with some form of heating by adding the prepared items in a certain sequence. In step (1), food items are washed, cut and chopped into desired sizes. In step (2), all the required ingredients are brought together in certain quantities to create tasty meals. In step (3), the prepared items are put together manually. This step involves mixing the prepared items in a cooking medium such as pan or pot.

There exist cooking devices that can cook certain recipes with minimum effort. For example, slow cookers can reduce work in step (3). But, only certain types of meals can be cooked with slow cookers. There exist programmable slower cookers that allow for the setting of cooking temperatures and times. Cooking with slow cookers still requires the execution of steps (1) and (2).

Also available are convenient pre-cooked and frozen food packages. This form of food cooking removes steps (1) and (2) from the process as the food items are already prepared. Step (3) may be partially completed before a package is made available to consumers.

Food items in the package may be pre-cooked. As a result, cooking requires minimum efforts and less time. However, nutritional value and taste degrade with this form of cooking. Most prepackaged food contains preservatives. Partially cooked food that is stored for a lengthy period of time tends to lose nutrients and is characterized by a degraded flavor.

There also exist fully automatic commercial- or industrial-style cooking devices that can perform all steps (1), (2) and (3) or steps (2) and (3) in an automated manner. However, such devices tend to be unnecessarily complicated. They are not suitable for consumer use and do not add convenience, and most of them are impractical.

SUMMARY

The present application provides for semi-automatic food cooking that brings all steps together in a way that reduces most of the tedious work. Consumers just insert a cooking cartridge preloaded with food items and supplementary cartridges containing supplementary contents (e.g. supplementary ingredients, condiments, and spices) to cook a meal in the apparatus that does the cooking with programmable cooking cycles. Step (1) of the process is simplified with prepared food items that are loaded in the cooking cartridge. Prepackaged fresh food items may also be made commercially available. Step (2) of the process is highly simplified with commercially available supplementary cartridges that are designed for a great variety of meals. Step (3) of the process is fully automated. The apparatus with programmable cooking cycle can cook meals with minimum or no human intervention.

Preferred embodiments of this present application provide several benefits, including one or more of the following:

The cooking method adds convenience to food cooking. Once the cooking cartridge and supplementary cartridges are inserted into the apparatus and a cooking program is initiated, the apparatus does all the cooking operations including heating, adding water, draining water, adding supplementary contents, mixing or stirring food items.

The cooking method is clean. The cooking cartridge is completely sealed during the cooking process. Its lid is open only when supplementary contents or water are added. This prevents spills from cooking. Certain types of cooking, for example stir-fry, create greasy spills if carried out with an open cooking medium, such as a wok.

The cooking method allows unlimited creativity in meal preparation. There is a great variety of meals to be prepared with many possible combinations of food items loaded in the cooking cartridge and supplementary contents provided through supplementary cartridges. Water may also be added.

The cooking method prepares meals from fresh food items that contain maximum amounts of original nutrients. Unlike precooked frozen food packages, the taste of food from this cooking method is not inferior to that from traditional cooking methods.

The apparatus does not have complicated designs and sophisticated operations. With the semi-automatic cooking method, the apparatus does not perform complex operations of loading food items and ingredients in certain sequence with a sophisticated dispenser. The cooking does not require a stirrer or a similar moving part. The apparatus mixes food items and supplementary contents by vibrating the cooking cartridge.

The cooking method is enhanced by user friendly interface and operations. Programs that control cooking cycles can be entered locally. They can also be uploaded or transferred through external devices such as smart phones or tablets. The apparatus can communicate with external devices and network with wire or wireless connections.

In an alternative aspect of the invention, supplemental cartridges are provided for use in such a system.

In one embodiment, a semi-automatic food cooking apparatus is provided comprising a control unit, and a cooking compartment. In this embodiment, the cooking compartment includes a cooking cartridge loading tray, which is adapted to receive a cooking cartridge that holds at least some of the ingredients of a recipe; a movable press, which is adapted to engage the top of the cooking cartridge; and a movable cooking base, to which is cooking cartridge loading tray is connected (directly or indirectly). In a preferred embodiment, the cooking cartridge is provided with a lid, and the movable press engages the lid of the cooking cartridge.

This embodiment may also include a cooking cartridge lid guide. This embodiment may further include a communication unit, through which information and/or instructions may be communicated between the apparatus and the user.

In a further embodiment, the movable press comprises: a movable press upper part; a movable press lower part; a press operating unit with means to set the position of the upper part relative to the lower part; and a spring, wherein (a) the lower part comprises: a vibrator; and a movable cooking cartridge lid holder; and (b) the spring is connected to the upper part and lower part of the movable press and allows independent movements of the upper part and the lower part. The movable press may further comprise a pressure sensor.

In an additional embodiment, the movable cooking base comprises a movable cooking base upper part, a movable cooking base lower part, wherein (a) the upper part comprises: a platform base; a cooking platform; and a vibrator coupled to the platform base, and (b) a spring coupled to the upper part and the lower part of the movable cooking base and allows for independent movements of the upper part and lower part.

In a preferred embodiment, the apparatus is adapted to receive a supplementary cartridge for loading supplementary contents, in addition to a cooking cartridge for loading the main food items.

In an alternative embodiment, a semi-automatic food cooking apparatus is provided comprising a control unit, a cooking compartment, and a supplementary cartridge loading compartment. The supplementary cartridge loading compartment may comprise a supplementary cartridge loading tray, and at least one supplementary content discharge gap. The cooking compartment may comprise a cooking cartridge loading tray, and a supplementary content loading chute. This embodiment may further include a communication unit, through which information and/or instructions may be communicated between the apparatus and the user.

The supplementary cartridge loading compartment may further comprise a supplementary cartridge cap opening device. The supplementary cartridge cap opening device may comprise a supplementary cartridge cap opening hook. The supplementary cartridge loading compartment may further comprise a supplementary cartridge socket and at least one vibrator. The foregoing embodiments may include a cooking cartridge for loading food items and a supplementary cartridge for loading supplementary contents.

Each of the foregoing embodiments may also include a heating element, which may be selected from the group consisting of a heating coil, induction heating element, microwave device, or combinations thereof. The apparatus may further include a cooling element, which may be selected from the group consisting of a ventilation fan, heat pipe, heat pump, and combinations thereof. The apparatus may further include a water inlet with a control valve, a waste water reservoir, a waste water draining device, and a waste water drain conduit.

Another embodiment of the invention is directed to a method for semi-automatic food cooking, wherein the method comprises: inserting a cooking cartridge containing food items in the cooking compartment of a semi-automatic cooking apparatus, wherein the cooking compartment comprises a cooking cartridge loading tray, a movable press, a movable cooking base, and a cooking cartridge lid guide; initiating a cooking cycle, and removing the cooking cartridge from the semi-automatic cooking apparatus at the end of the cooking cycle. As part of inserting the cooking cartridge, the method may further include: opening the cooking cartridge loading tray, placing the cooking cartridge on the cartridge loading tray, closing the cooking cartridge loading tray. The method may further comprise the execution of a cooking program to control the cooking cycle.

In a further embodiment, the cooking cycle comprises a step selected from the group consisting of: setting the movable press in a "ready" position, setting the movable press in a "press" position, setting the movable press in a "lift" position, and combinations thereof. The cooking cycle may also comprise activating one or more of a first vibrator coupled to the movable press and a second vibrator coupled to the movable cooking base. In addition, the cooking cycle may comprise one or more of adding water to the cooking cartridge and draining water from the cooking cartridge. The cooking cycle may further comprise adding supplementary contents to the cooking cartridge.

In an another embodiment, a method enables semi-automatic food cooking, wherein the method comprises inserting a cooking cartridge containing food items in a cooking compartment of a semi-automatic cooking apparatus; inserting a supplementary cartridge containing supplementary contents in a supplementary loading compartment of the semi-automatic cooking apparatus; initiating a cooking cycle, and removing the cooking cartridge and the supplemental cartridge from the semi-automatic cooking apparatus at the end of the cooking cycle. The cooking compartment may comprise a cooking cartridge loading tray and a supplementary content loading chute, and the supplementary compartment may comprise a supplementary cartridge loading tray a supplementary content discharge gap. The method may further comprise the execution of a cooking program to control the cooking cycle.

To insert the supplementary cartridge, the method may further comprise opening the supplementary cartridge loading tray, placing the supplementary cartridge on the supplementary cartridge loading tray and closing the supplementary cartridge loading tray. The cooking cycle may further comprise opening the supplementary cartridge and discharging the supplementary contents through the supplementary discharge gap and the supplementary loading chute into the cooking cartridge. The cooking cycle may also comprise one or more of adding water to the cooking cartridge and draining water from the cooking cartridge. In addition, the cooking cycle may comprise activating a vibrator to assist the discharge of contents from the supplementary cooking cartridge. The method may also comprise one or more of adding food items to the cooking cartridge and adding supplementary contents to the supplementary cartridge.

An alternative embodiment of the invention is directed to a supplementary cartridge for holding supplemental ingredients. In a preferred embodiment, the supplementary cartridge includes a housing for holding its contents, and an airtight cap that can be removed in order to allow the contents to empty out. The cap preferably includes an aperture or indentation that is adapted to be engaged by a hook in the apparatus, so that the hook can moved so as to open the cap. The supplementary cartridge also preferably includes a code label for setting cooking program to control the cooking cycle.

BRIEF DESCRIPTION OF DRAWINGS

The accompanying drawings, which are incorporated in and constitute a part of this specification, illustrate embodiments and together with the description, serve to explain the principles of the methods and systems:

FIG. 11A illustrates the top compartment. FIG. 11B illustrates the cooking compartment.

FIG. 12A illustrates the movable press in "ready" position. FIG. 12B illustrates the movable press in "press" position. FIG. 12C illustrates the movable press in "lift" position.

FIG. 13A illustrates the movable cooking base when the cartridge seal opener is in "down" position. FIG. 13B illustrates the movable cooking base when the cartridge seal opener is in "up" position.

FIG. 14A illustrates the cooking cartridge when the lid is open. FIG. 14B illustrates the cooking cartridge when the lid is close.

FIG. 15A illustrates the top view of the cooking cartridge. FIG. 15B illustrates a cartridge holder or case.

FIGS. 17A, 17B and 17C are diagrams illustrating supplementary cartridge loading compartment of the semi-automatic food cooking apparatus of FIG. 1, in accordance with an illustrative embodiment. FIG. 17A illustrates the supplementary cartridge with cap in sealed position. FIG. 17B illustrates the supplementary cartridge with cap in open position. FIG. 17C illustrates the bottom view of the supplementary cartridge loading tray.

DETAILED DESCRIPTION OF SPECIFIC EMBODIMENTS

Example Semi-Automatic Food Cooking System
Overall System

Figure 1:
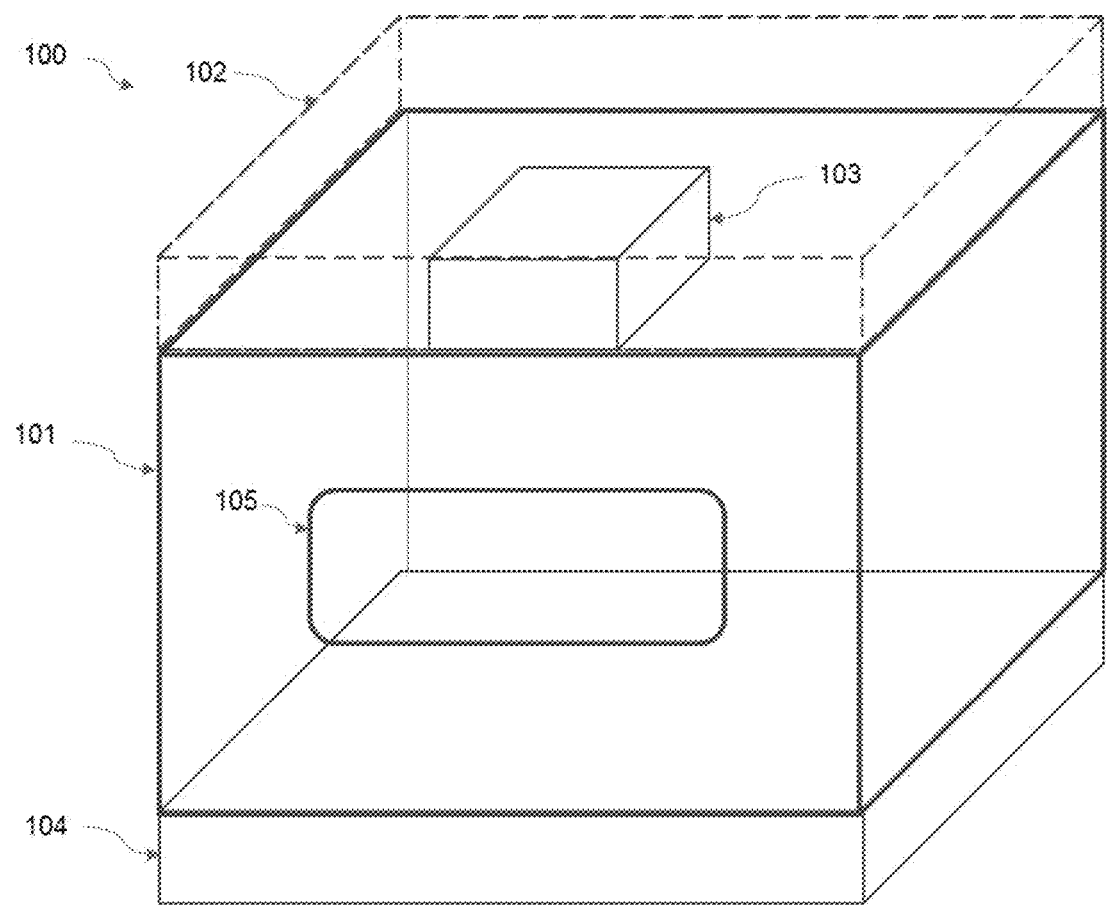
FIG. 1 is a perspective view illustrating an exemplary semi-automatic food cooking apparatus, in accordance with an illustrative embodiment.

FIG. 1 is a system diagram illustrating an exemplary semi-automatic food cooking apparatus 100, in accordance with an illustrative embodiment. The apparatus may have combinations of the following main sections: (1) cooking compartment 101 that houses parts for cooking operations, (2) top compartment 102 that may have a clean water reservoir, control unit, communication unit, and user interface display unit, (3) supplementary cartridge loading compartment 103, and (4) base compartment 104 that may have a waste water reservoir, control unit, and communication unit. The apparatus may be equipped with one or more of the following parts: temperature sensor, pressure sensor, smoke detector, humidity sensor, vibration sensor, sound detector, light detector, code reader or scanner, carbon-monoxide detector, air filter, water filter, water level detector, and limit switch.

The control unit may be, for instance, a microprocessor controlling and operating the parts of the apparatus 100 prior to, during, and after the execution of a cooking program to control a cooking cycle for the meal being prepared. The cooking programs may be pre-programmed in a memory storage unit (not shown), loaded by an external device (such as smart phone, tablet or computer), or entered by the user. Cooking programs may also be encoded in a cartridge loaded into the system, as detailed below. The communication unit may be provided with a user interface for entering instructions for and trading information with the control unit. In one example, the communication unit includes a keypad for entering instructions and choosing a cooking program from among those stored in the memory storage unit. The keypad may serve as means for entering and saving the parameters of new cooking cycles as desired by the user. The communication unit may also include a monitor (not shown) for communicating information from the control unit to the user, such as the state of progress of a cooking cycle or messages transmitted to the user when their attention is required.

Figure 2:
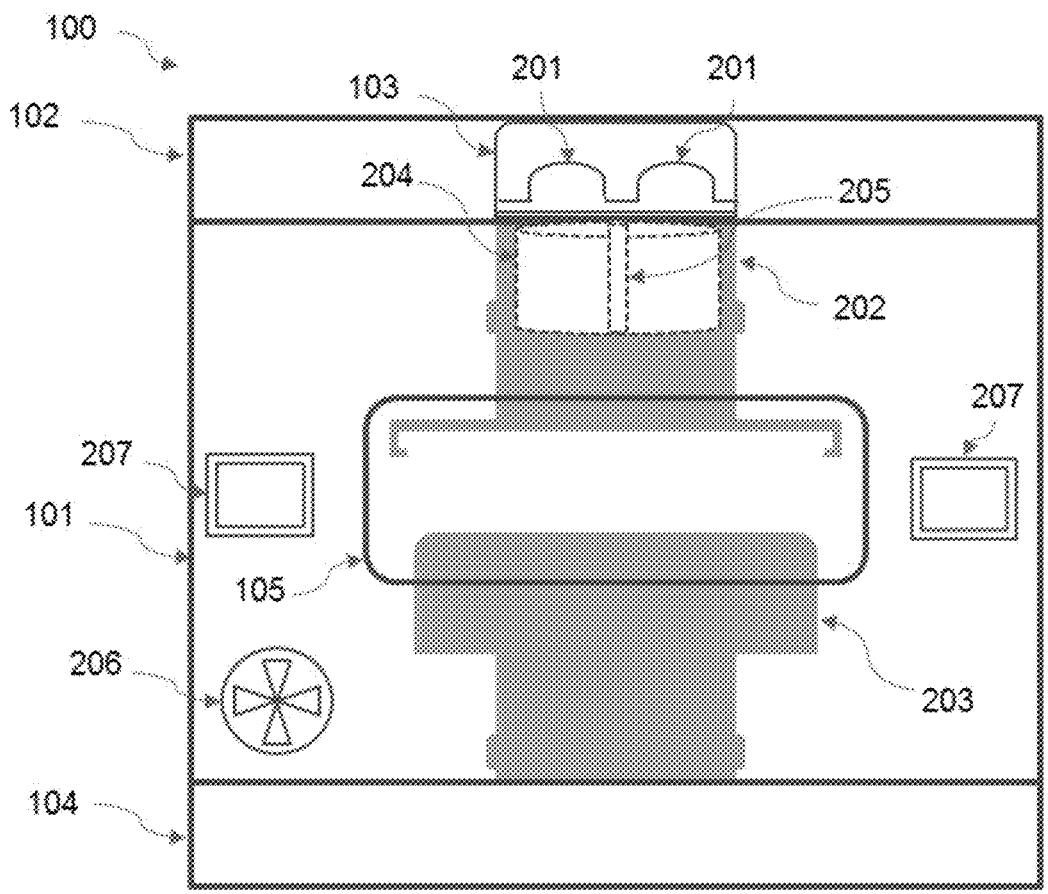
FIG. 2 is a diagram illustrating the front view of the semi-automatic food cooking apparatus of FIG. 1, in accordance with an illustrative embodiment, when the movable press is in "ready" position.
Figure 6:
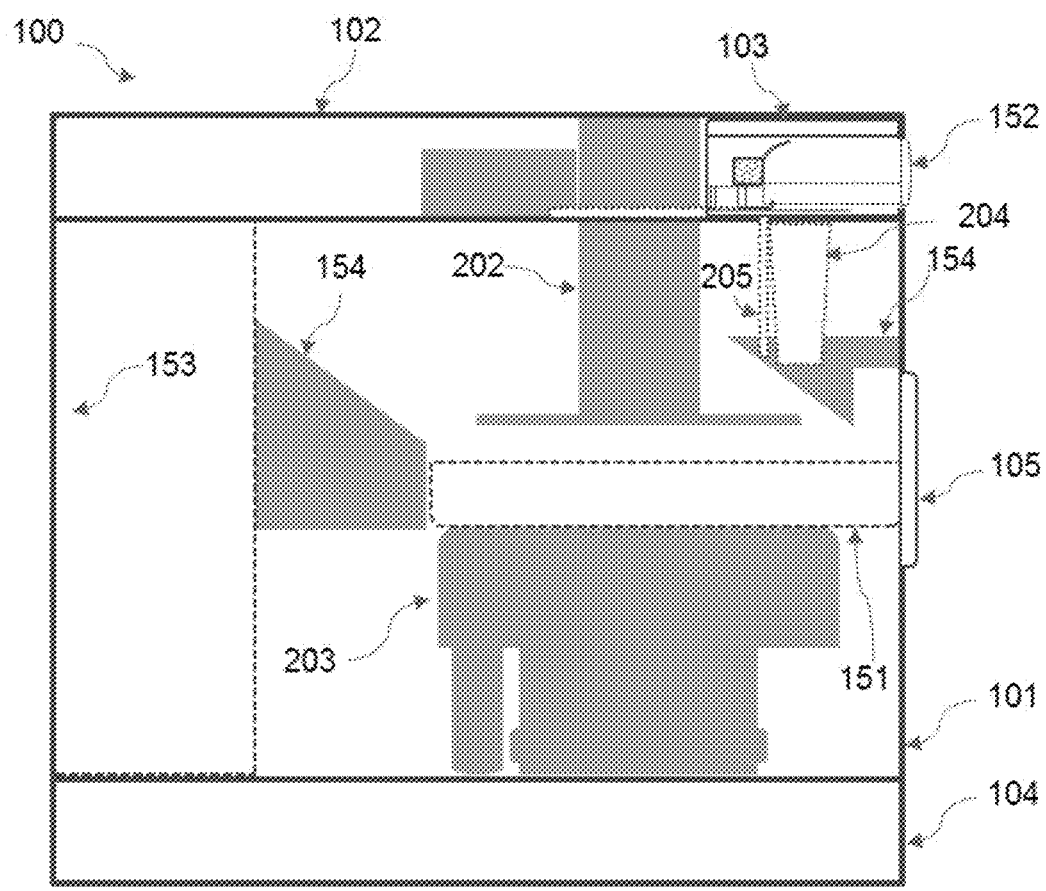
FIG. 6 is a diagram illustrating the side view of the semi-automatic food cooking apparatus of FIG. 1, in accordance with an illustrative embodiment, when the cooking cartridge loading tray and supplementary cartridge loading tray are in "close" position, and movable press is in "ready" position.

FIG. 2 is a diagram illustrating the front view of the semi-automatic food cooking apparatus of FIG. 1, in accordance with an illustrative embodiment. The supplementary cartridge loading compartment 103 may have at least one supplementary cartridge socket 201 that securely holds an inserted supplementary cartridge in place, and supplementary cartridge loading tray 152 (as shown in FIG. 6). The cooking compartment 101 may have a movable press 202, a movable cooking base 203, door 105 with cooking cartridge loading tray 151 (as shown in FIG. 6), supplementary content loading chute 204, a water inlet for adding water to the water cartridge, for instance water tube 205 with control valve (not shown), and ventilation fan 206. The cooking compartment 101 may have code reader, code scanner, smoke detector, and sensors for temperature, humidity and pressure as illustrated by 207.

FIG. 6 is a diagram illustrating a side view of the semi-automatic food cooking apparatus of FIG. 1, in accordance with an illustrative embodiment. The cooking compartment 101 may have a back compartment 153 that may have a cooling element such as a ventilation fan, heat pipe, or heat pump (not shown) and a control unit (not shown). Cooking cartridge lid guides 154 may be installed in the cooking compartment 101 to push the cooking cartridge lid 502 toward the back of the cooking compartment 101 when the movable press 202 is lifted.

Figure 11A:
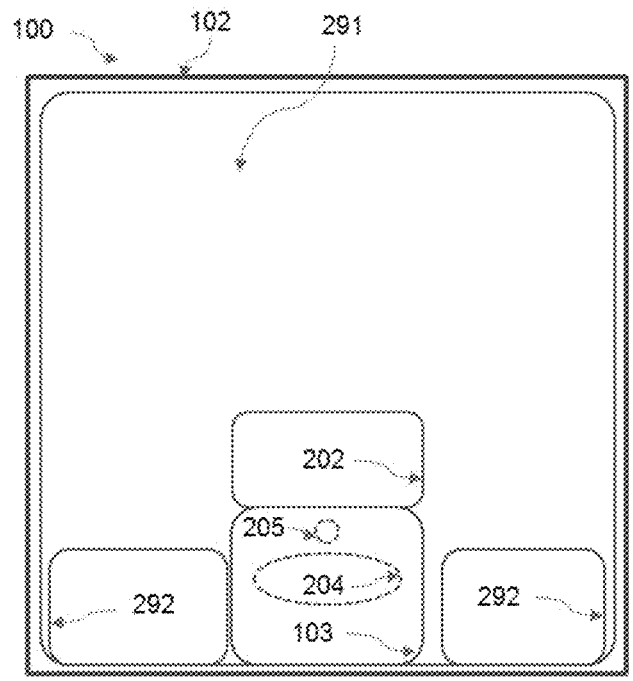
FIGS. 11A and 11B are diagrams illustrating the top view of the semi-automatic food cooking apparatus of FIG. 1, in accordance with an illustrative embodiment.
Figure 11B:
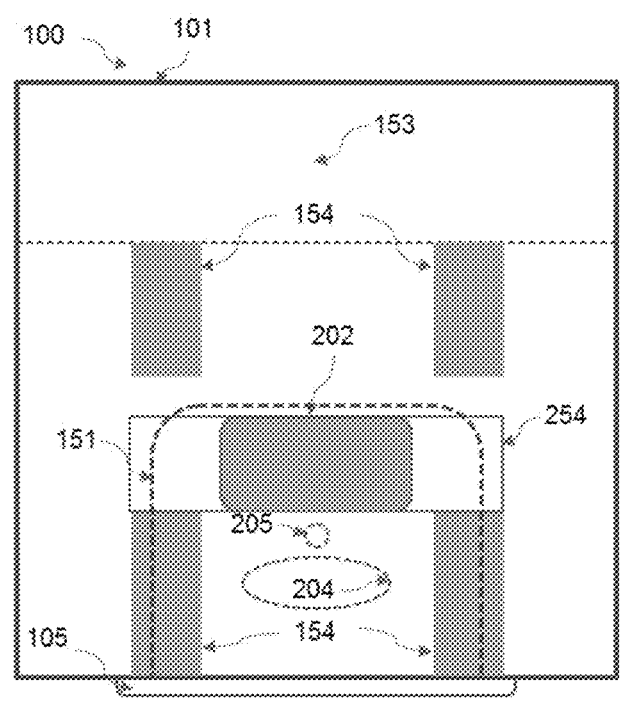

FIG. 11 are diagrams illustrating the top view of the semi-automatic food cooking apparatus of FIG. 1, in accordance with an illustrative embodiment. FIG. 11A illustrates the top view of the top compartment 102 with example positions of optional water reservoir 291, control and display units 292, movable press 202, supplementary cartridge loading compartment 103, supplementary content loading chute 204, and water tube 205. FIG. 11B illustrates the top view of the cooking compartment 101 with example positions of cooking cartridge lid guides 154, door 105, movable press 202, cooking cartridge lid holder 254, supplementary content loading chute 204, and water tube 205.

Movable Press

FIG. 12 includes diagrams illustrating the movable press 202 of the semi-automatic food cooking apparatus of FIG. 1, in accordance with an illustrative embodiment. The movable press 202 may have press operating unit 251 that moves the ensemble of the moveable press including the upper part of the press 255 and the lower part of the press. The lower part of the movable press may include spring 252, a pressure sensor (not shown), vibrator 253, and cooking cartridge lid holder 254. The spring 252 allows the lower part to move somewhat freely when the vibrator is activated while the upper part is fixed.

Figure 12A:
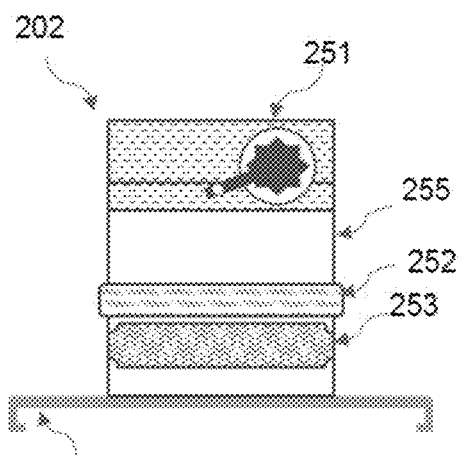
FIGS. 12A, 12B and 12C are diagrams illustrating the movable press of the semi-automatic food cooking apparatus of FIG. 1, in accordance with an illustrative embodiment.
Figure 12B:
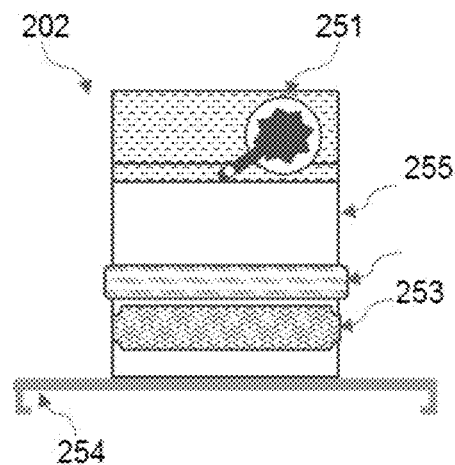
Figure 12C:
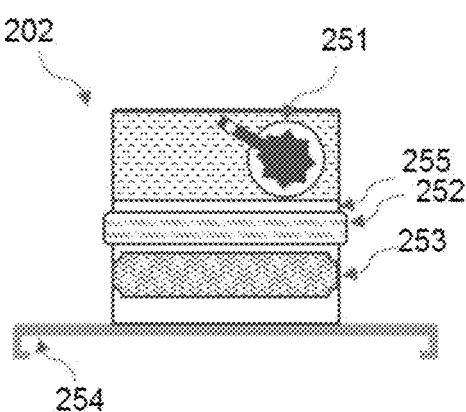

FIG. 12A illustrates the movable press in "ready" position. FIG. 12B illustrates the movable press in "press" position. FIG. 12C illustrates the movable press in "lift" position.

Movable Cooking Base

FIG. 13 includes diagrams illustrating the movable cooking base 203 of the semi-automatic food cooking apparatus of FIG. 1, in accordance with an illustrative embodiment. The upper part of the movable cooking base 203 may have cooking platform 281. Cooking platform 281 may be equipped with a heating element, for example one or more of a heating coil, induction heating element, and micro-wave device. The cooking platform 281 may be equipped with sensors (not shown) for temperature and pressure. The cooking platform 281 may be mounted on a platform base 282 that may be equipped with vibrator 283, and optionally a pressure sensor (not shown).

Spring 284 connects the upper part of the movable cooking base to the lower part 288 of the movable cooking base 203. The spring 284 allows the upper part to move somewhat freely when the vibrator 283 is activated while the lower part 288 is fixed. The movable cooking base 203 may be equipped with a waste water drain conduit, such as drain water tube 287.

Figure 13A:
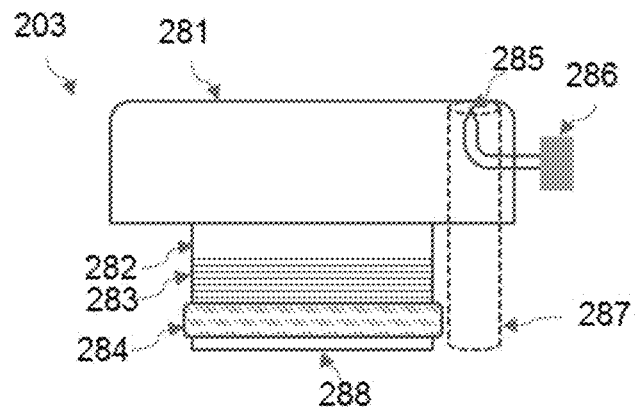
FIGS. 13A and 13B are diagrams illustrating the movable cooking base of the semi-automatic food cooking apparatus of FIG. 1, in accordance with an illustrative embodiment.
Figure 13B:
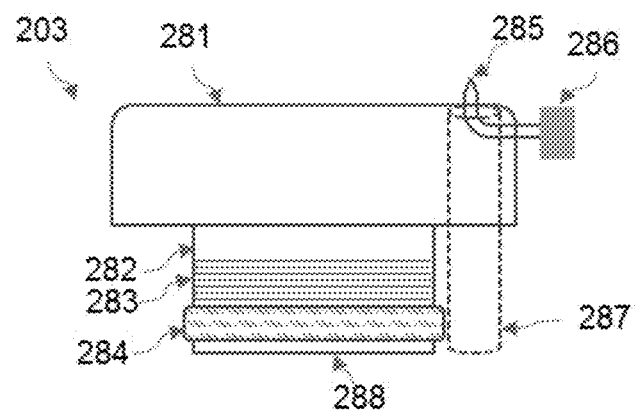

A waste water draining device may also be included, for example a cartridge drain seal opener rod 285 and cartridge drain seal opener rod operating device 286 which operate together for draining water from the cooking cartridge. FIG. 13A illustrates the cartridge seal opener in "down" position. FIG. 13B illustrates the cartridge seal opener in "up" position at which the cartridge drain seal movable disc 507 (shown in FIG. 14) is pushed upward to create a small gap for draining water from the cooking cartridge.

Supplementary Cartridge Loading Compartment

FIG. 17 includes diagrams illustrating supplementary cartridge loading compartment 103 of the semi-automatic food cooking apparatus of FIG. 1, in accordance with an illustrative embodiment. The supplementary cartridge loading compartment 103 may have one or more of supplementary cartridge loading tray 152, supplementary cartridge cap opening device 601, supplementary cartridge cap opening hook 602, and vibrator 603. Supplementary cartridge 701 may be inserted into the supplementary cartridge socket 201 and securely held in position. FIG. 17A illustrates the supplementary cartridge with its cap in sealed position. When triggered by a cooking program, the supplementary cartridge cap opener (601 and 602) pulls the supplementary cartridge cap 704. The supplementary contents drop through supplementary cartridge opening 707 and supplementary content discharge gap 604. The vibrator 603 may be used to assist in the discharge of contents from the supplementary cartridge. FIG. 17B illustrates the supplementary cartridge with its cap in open position. FIG. 17C illustrates the bottom view of the supplementary cartridge loading tray. The supplementary cartridge on the left has its cap in sealed position. The one on the right has its cap in open position.

Cooking Cartridge

Figure 14:
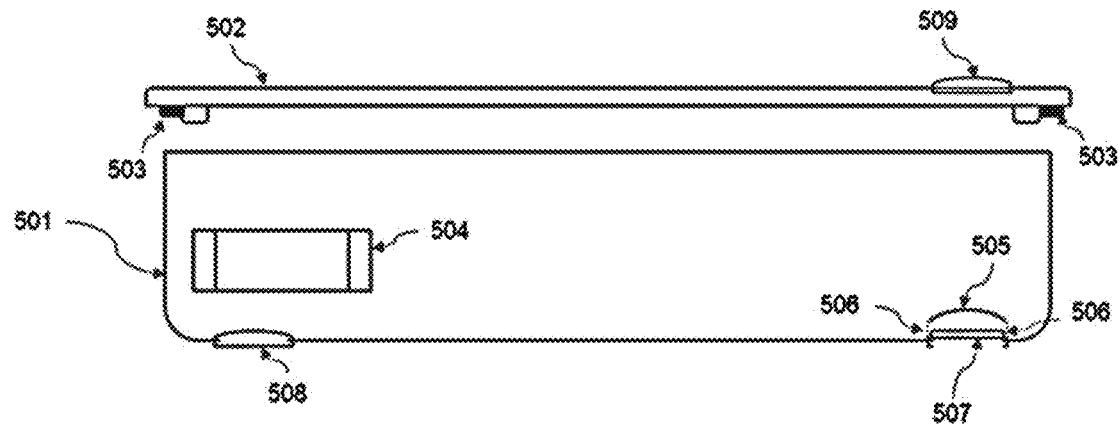
FIGS. 14A and 14B are diagrams illustrating the cooking cartridge of the semi-automatic food cooking apparatus of FIG. 1, in accordance with an illustrative embodiment.
Figure 14B:
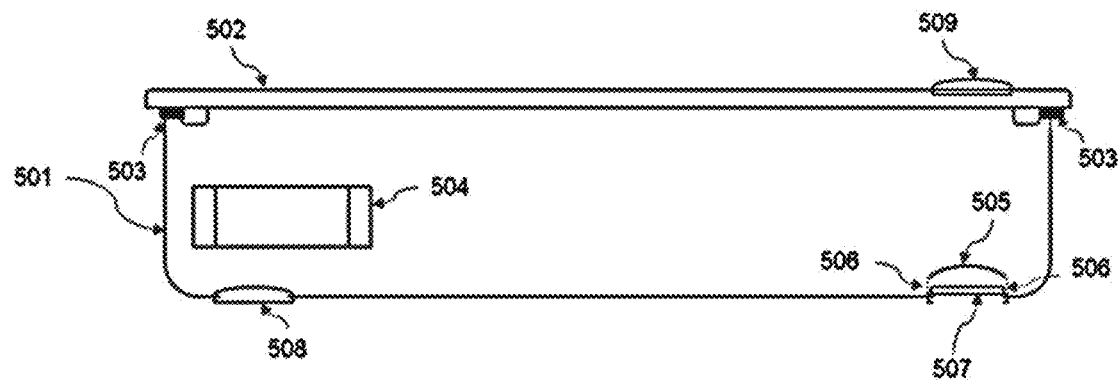
Figure 15A:
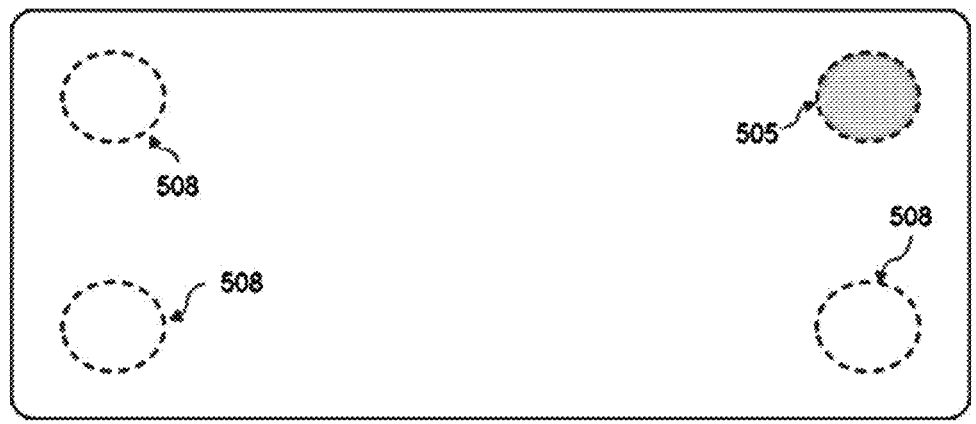
FIGS. 15A and 15B are diagrams illustrating the cooking cartridge of the semi-automatic food cooking apparatus of FIG. 1, in accordance with an illustrative embodiment.
Figure 15B:
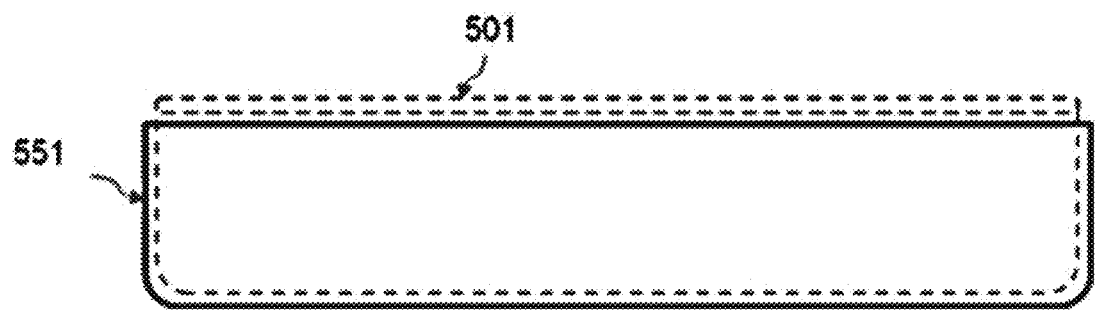

FIG. 14 is a diagram illustrating the cooking cartridge of the semi-automatic food cooking apparatus of FIG. 1, in accordance with an illustrative embodiment. The cooking cartridge may have two parts: cartridge 501 and lid 502. FIG. 14A illustrates the cooking cartridge when the lid is open. FIG. 14B illustrates the cooking cartridge when the lid is closed. The lid 502 may have heat resistant seal 503 and pressure release seal 509. The cartridge 501 is made with sturdy material that withstands pressure from the movable press 202 and heat from the cooking base 203. It is made of a material suitable to allow efficient heat transfer from the heating element. The cartridge 501 may have code 504 for setting cooking program that controls a cooking cycle for the meal being prepared. The cartridge 501 may have water drain seal 505 tightly seals the cartridge with housing made with sturdy material and filled with softer material such as heat-resistant silicone. The water drain seal 505 may have strainer 506 preventing food items from exiting the cartridge and movable disc 507 that can be pushed upward to create a small gap for draining water. The cartridge 501 may have cartridge base 508. FIG. 15A illustrates the top view of the cooking cartridge with example positions of water drain seal 505 and cartridge base 508. FIG. 15B illustrates cartridge holder 551 that is made of heat insulated material for holding hot cartridge. The shape of the cartridge holder 551 is generally conforming to the shape of the cooking cartridge 501.

Figure 16A:
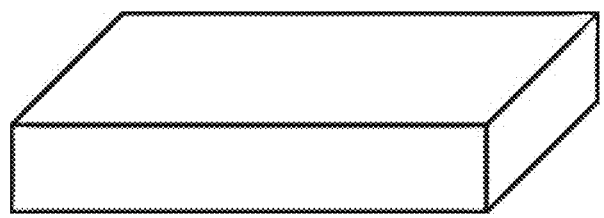
FIGS. 16A, 16B and 16C are diagrams illustrating example shapes for the cooking cartridge, in accordance with an illustrative embodiment.
Figure 16B:
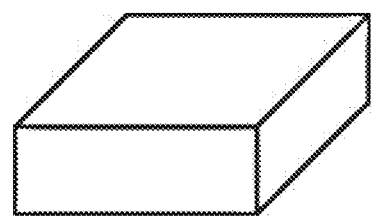
Figure 16C:
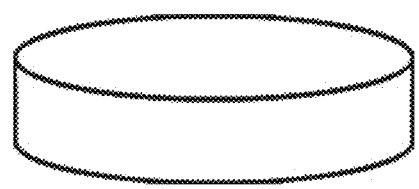
Figure 18A:
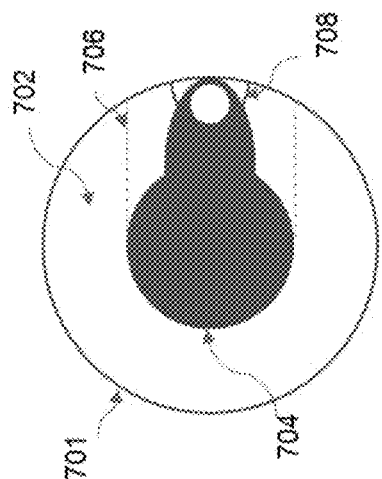
FIGS. 18A-18E are diagrams illustrating supplementary cartridge of the semi-automatic food cooking apparatus of FIG. 1, in accordance with an illustrative embodiment.
Figure 18B:
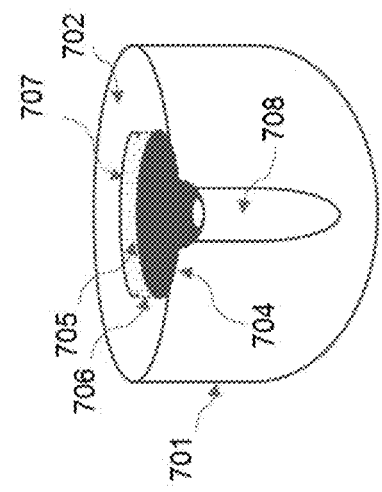
Figure 18C:
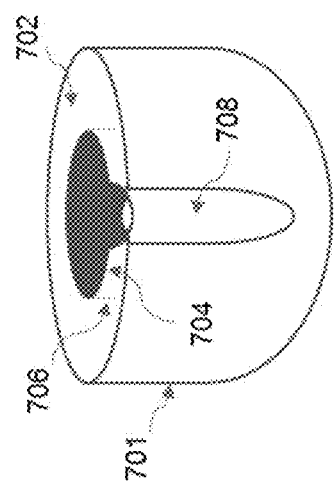
Figure 18D:
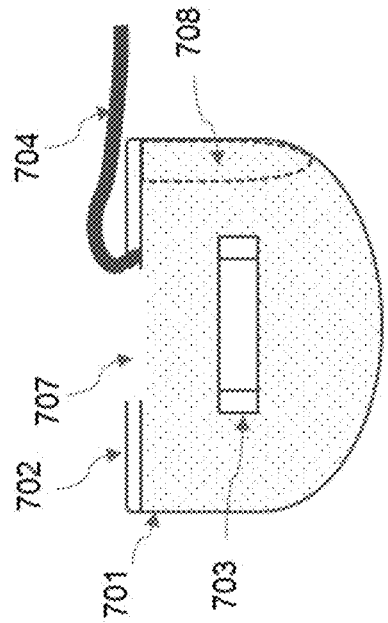
Figure 18E:
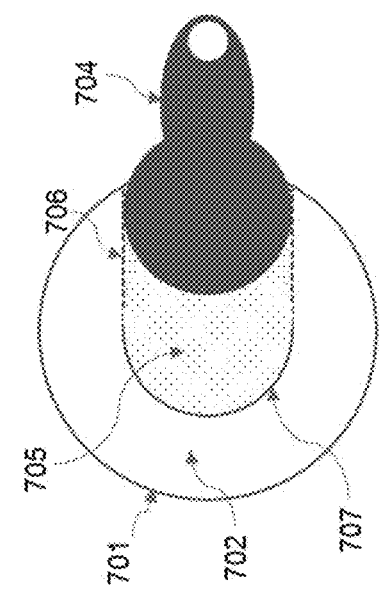
Figure 19A:
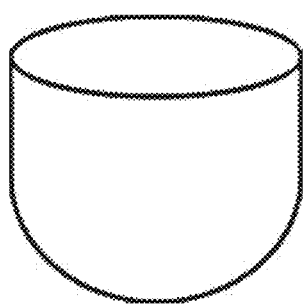
FIGS. 19A-19D are diagrams illustrating example form factors of supplementary cartridge, in accordance with an illustrative embodiment.
Figure 19B:
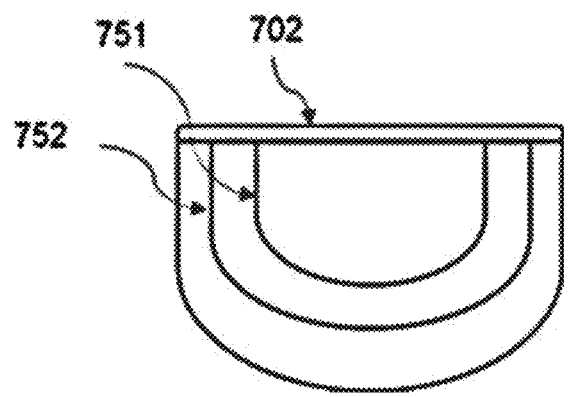
Figure 19C:
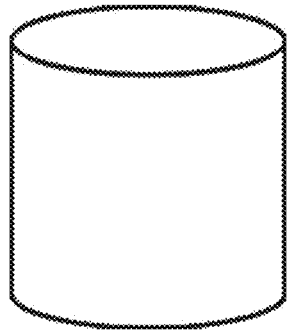
Figure 19D:
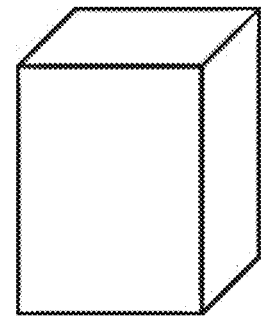

FIG. 16 are diagrams illustrating example form factors of cooking cartridge 501, in accordance with an illustrative embodiment. FIG. 16A is rectangular form. FIG. 16B is square form. FIG. 16C is disc form.

Cooking cartridge 501 and its lid 502 can be either reusable or single-use.

Supplementary Cartridge

FIG. 18 are diagrams illustrating supplementary cartridge 701 of the semi-automatic food cooking apparatus of FIG. 1, in accordance with an illustrative embodiment. The supplementary cartridge 701 is made of light weight material suitable for its contents. It may have airtight seal 702, airtight cap 704 that can be removed with a gentle pull, seal opening cutout 706 assisting the opening when the cap is pulled, opening 707 for content discharge, and dip 708 for cartridge proper positioning in the supplementary cartridge compartment 103. The supplementary cartridge 701 may have code label 703 for setting cooking program to control cooking cycle. FIG. 18A and FIG. 18C illustrate the supplementary cartridge with its cap in sealed position. FIG. 18B and FIG. 18D illustrate the supplementary cartridge with its cap in pulled position. Supplementary contents 705 can be seen through the opening 707 when the cap 704 is pulled open. FIG. 18E illustrates the side view of the supplementary cartridge with its cap in pulled position.

FIG. 19 are diagrams illustrating example shapes for supplementary cartridge 701, in accordance with an illustrative embodiment. FIG. 19A is formed in the shape of a cup. FIG. 19B is a multi-layer cup having at least one inner layer 701 or 702 for separation of contents. FIG. 19C is in the shape of a cylinder or disc. FIG. 19D is in the shape of a brick. The supplementary cartridge 701 can be either reusable or single-use.

Operating Positions

The exemplary semi-automatic food cooking system may be in the following operating positions:

READY: As illustrated in FIG. 2 (front view) and FIG. 6 (side view), the cooking cartridge loading tray 151 is closed and empty, the supplementary cartridge loading tray 152 is closed and empty, and the movable press 202 is in "ready" position.

Figure 7:
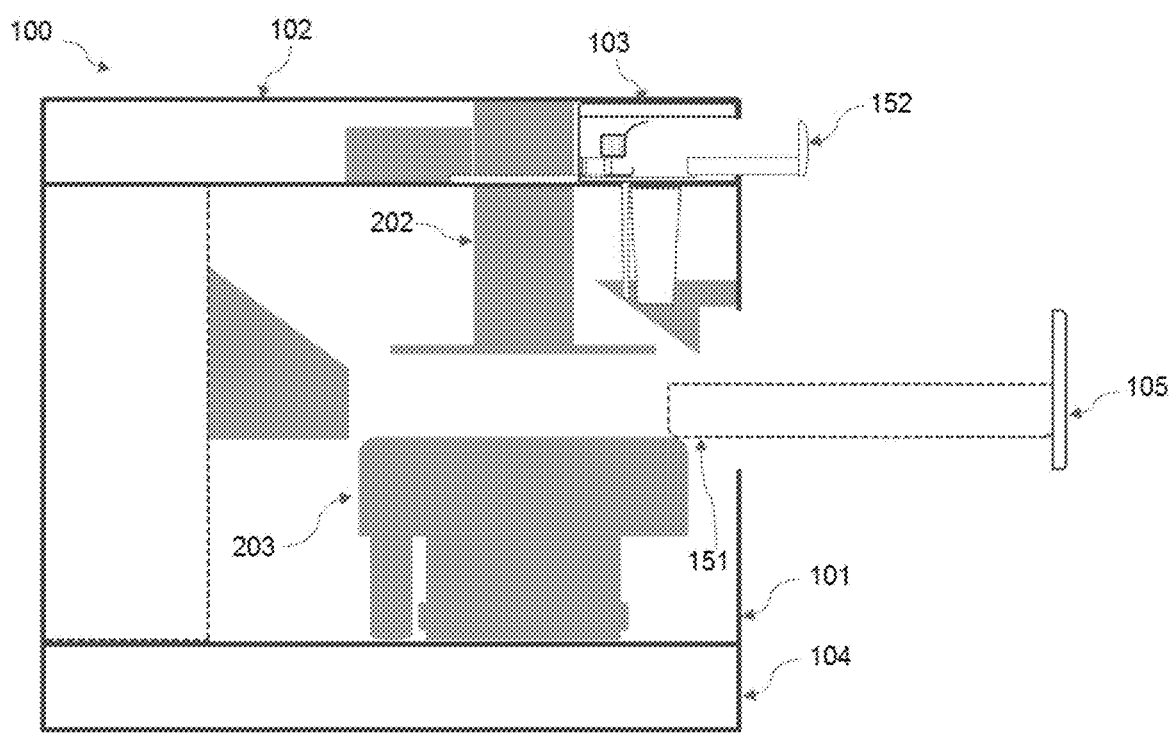
FIG. 7 is a diagram illustrating the side view of the semi-automatic food cooking apparatus of FIG. 1, in accordance with an illustrative embodiment, when the cooking cartridge loading tray and supplementary cartridge loading tray are in "open" position, and the movable press is in "ready" position.

LOADING: As illustrated in FIG. 7 (side view), the cooking cartridge loading tray 151 is open and empty, the supplementary cartridge loading tray 152 is open and empty, and the movable press 202 is in "ready" position.

Figure 8:
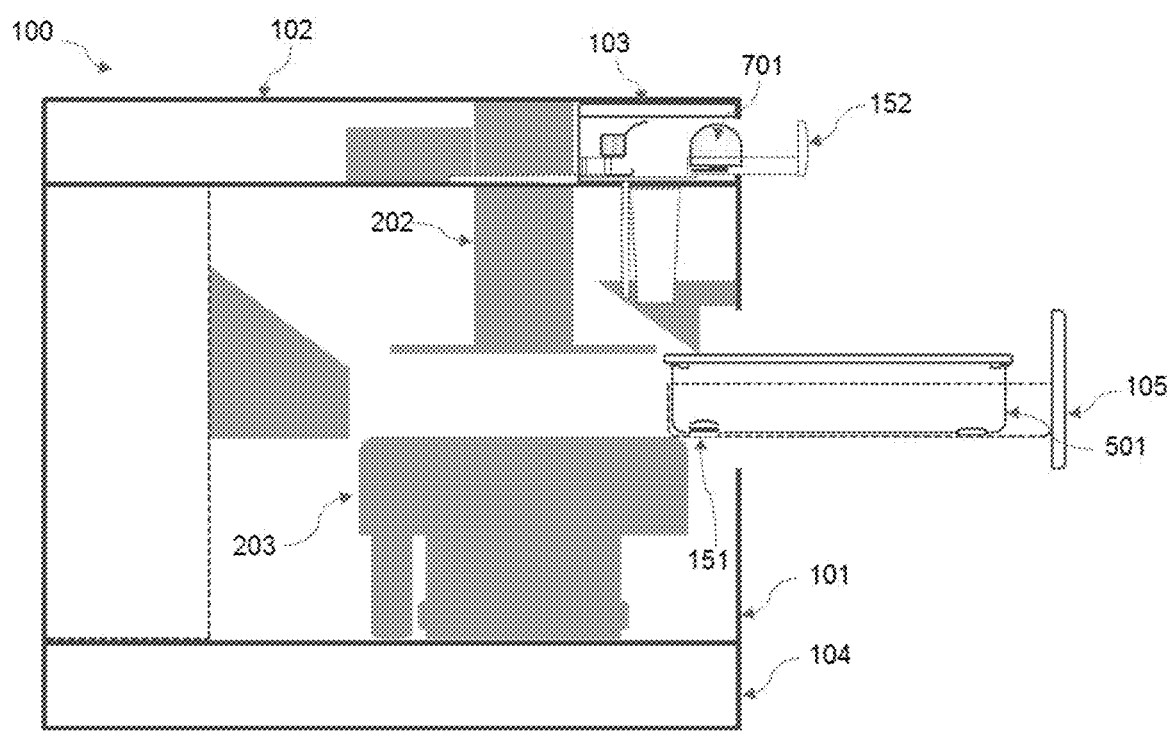
FIG. 8 is a diagram illustrating the side view of the semi-automatic food cooking apparatus of FIG. 1, in accordance with an illustrative embodiment, when the cooking cartridge loading tray and supplementary cartridge loading tray are in "open" position, and a cooking cartridge and supplementary cartridges are inserted.

LOADED: As illustrated in FIG. 8 (side view), the cooking cartridge loading tray 151 is open and loaded, the supplementary cartridge loading tray 152 is open and loaded, and the movable press 202 is in "ready" position.

Figure 3:
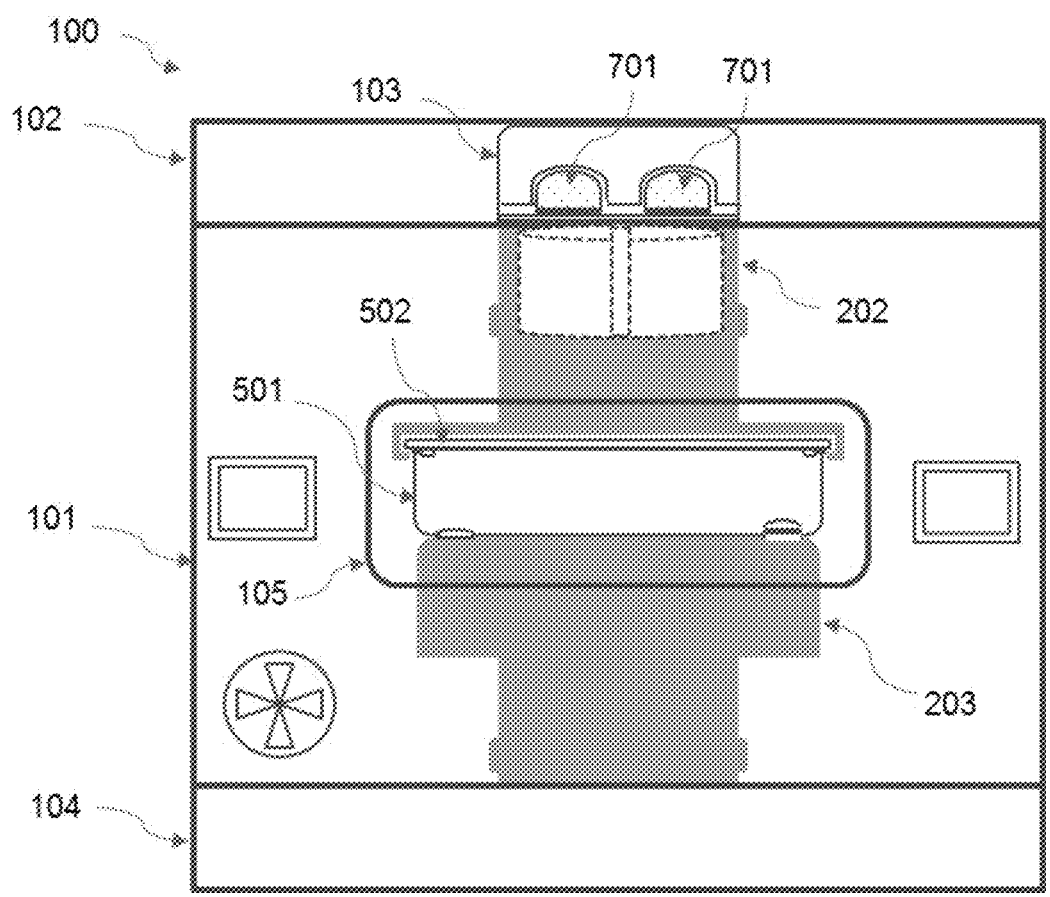
FIG. 3 is a diagram illustrating the front view of the semi-automatic food cooking apparatus of FIG. 1, in accordance with an illustrative embodiment, when the movable press is in "ready" position, a cooking cartridge is inserted, and supplementary cartridges are inserted.

INSERTED: As illustrated in FIG. 3 (front view), both cooking cartridge 501 and supplementary cartridges 701 are inserted in position, and the movable press 202 is in "ready" position. The cooking cartridge 501 can easy move through the gap between the movable press 202 and the movable cooking base 203.

Figure 4:
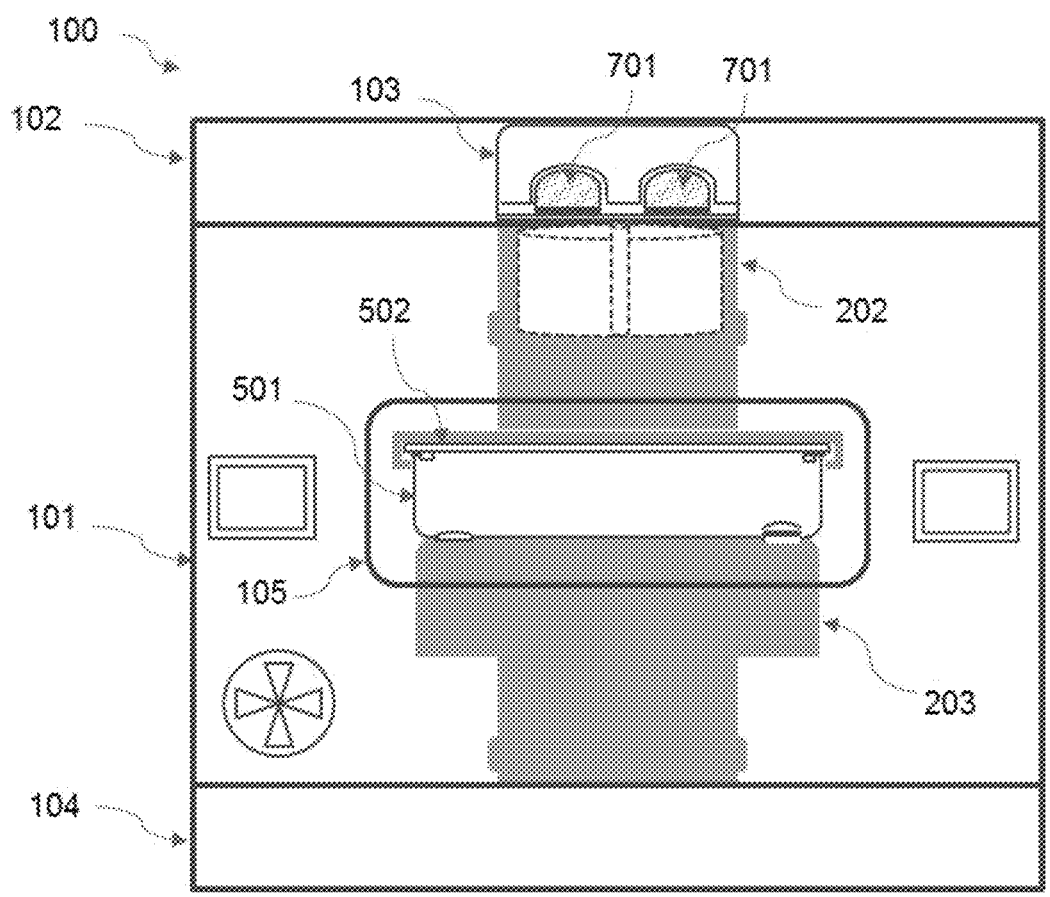
FIG. 4 is a diagram illustrating the front view of the semi-automatic food cooking apparatus of FIG. 1, in accordance with an illustrative embodiment, when the movable press is in "press" position, a cooking cartridge is inserted, and supplementary cartridges are inserted.
Figure 9:
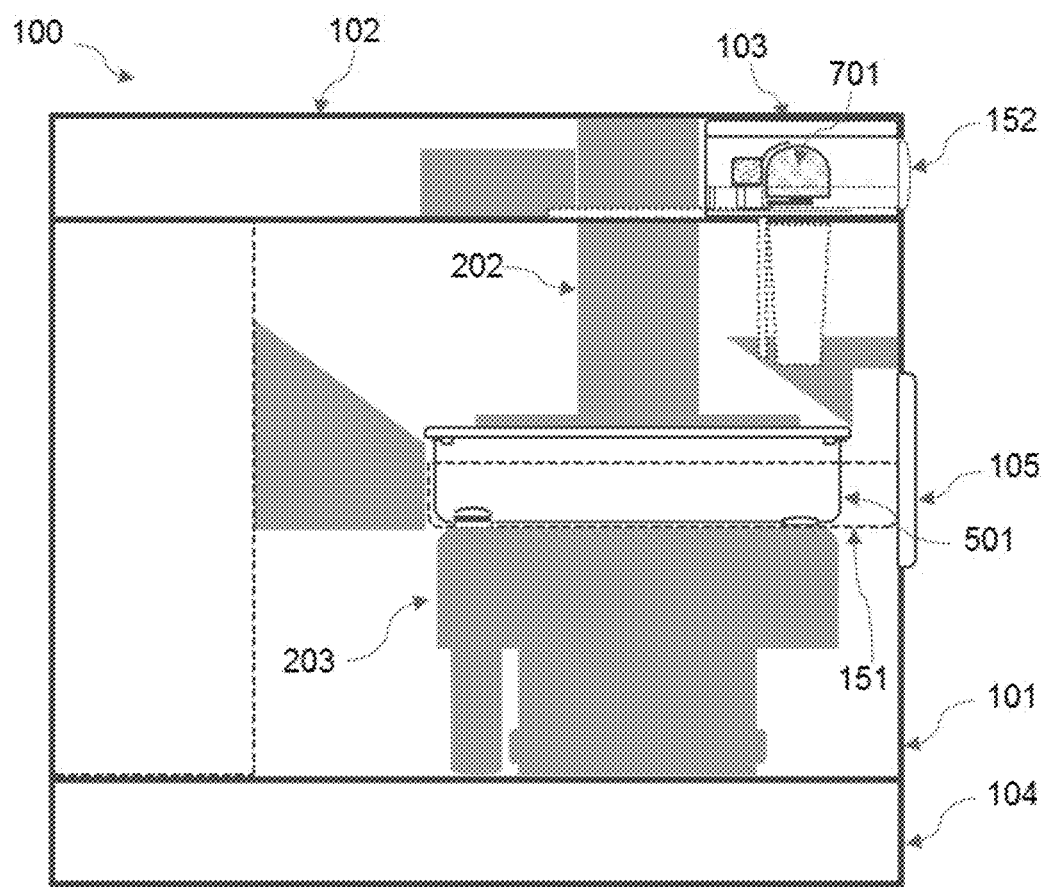
FIG. 9 is a diagram illustrating the side view of the semi-automatic food cooking apparatus of FIG. 1, in accordance with an illustrative embodiment, when the cooking cartridge loading tray and supplementary cartridge loading tray are in "close" position, a cooking cartridge and supplementary cartridges are inserted, and movable press is in "press" position.

PRESS: As illustrated in FIG. 4 (front view) and FIG. 9 (side view), the cooking cartridge loading tray 151 is closed and loaded, the supplementary cartridge loading tray 152 is closed and loaded, both cooking cartridge and supplementary cartridges are inserted, and the movable press 202 is in "press" position. In this position, the cooking cartridge is held securely by the movable press 202 and the movable cooking base 203. The vibrators 253 and 283 can shake the cooking cartridge to impart a "stirring" motion to the contents in the cooking cartridge.

Figure 5:
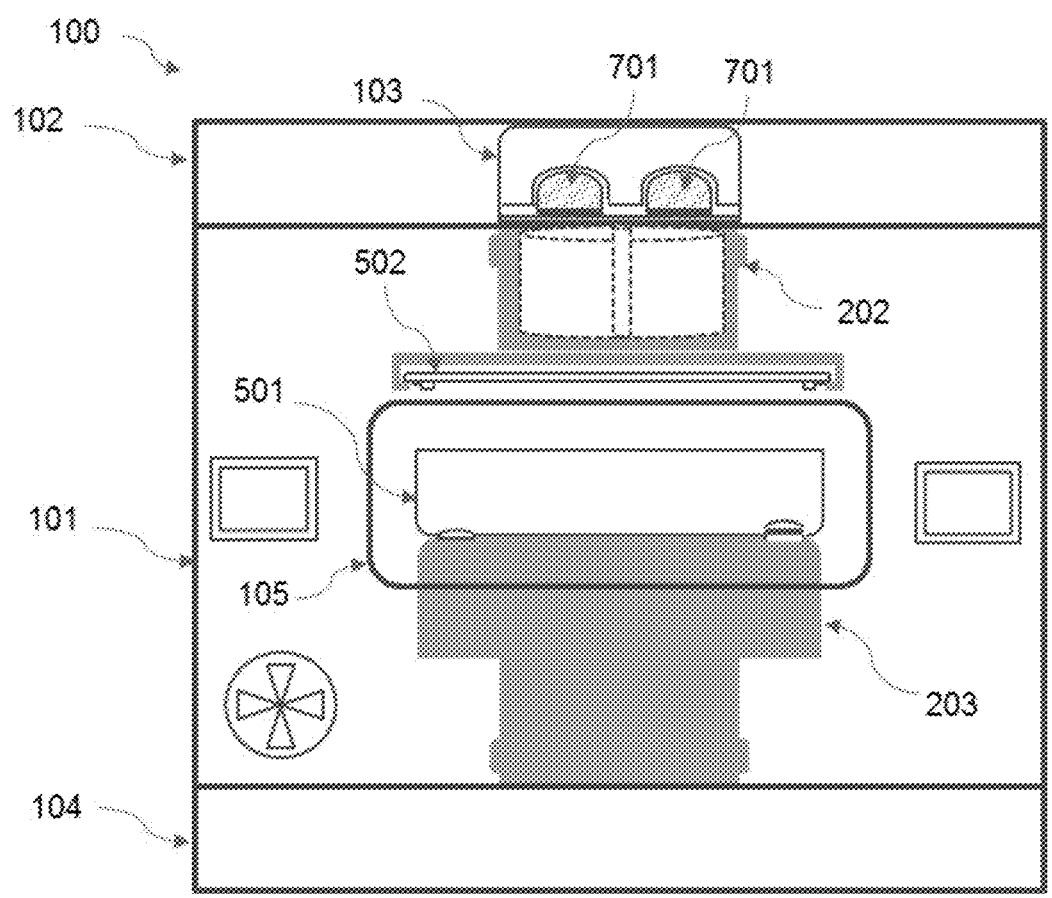
FIG. 5 is a diagram illustrating the front view of the semi-automatic food cooking apparatus of FIG. 1, in accordance with an illustrative embodiment, when the movable press is in "lift" position.
Figure 10:
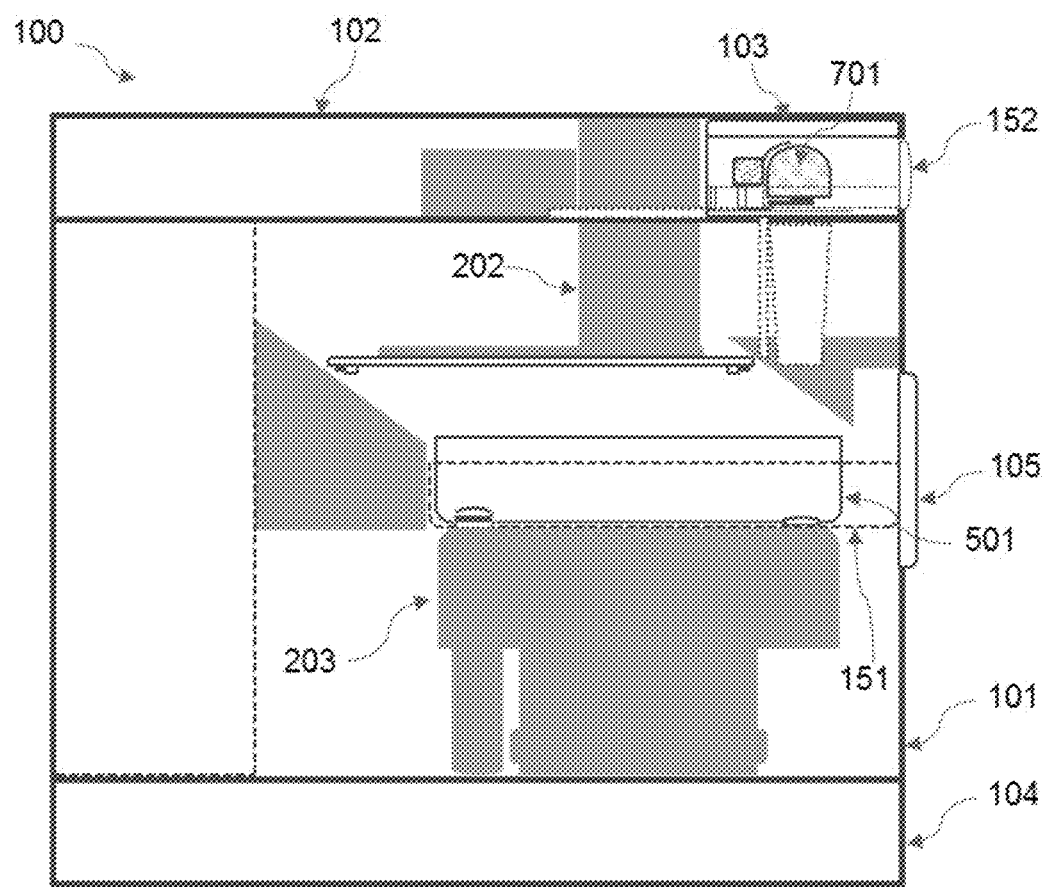
FIG. 10 is a diagram illustrating the side view of the semi-automatic food cooking apparatus of FIG. 1, in accordance with an illustrative embodiment, when the cooking cartridge loading tray and supplementary cartridge loading tray are in "close" position, a cooking cartridge and supplementary cartridges are inserted, and movable press is in "lift" position.

LIFT: As illustrated in FIG. 5 (front view) and FIG. 10 (side view), the movable press 202 is in "lift" position. The cooking cartridge lid holder 254 carries the cooking cartridge lid 502 though cooking cartridge lid guides 154. In this position, the cooking cartridge lid 502 is pushed toward to the back of the cooking compartment 101 so that supplementary contents and clean water can drop directly into the cooking cartridge 501 through supplementary content loading chute 204 and water tube 205, respectively.

Example Method of Operation

The method for semi-automatic food cooking may include one or more of the following steps:

Put food items into cooking cartridge 501. The food items may be prepared completely from scratch at the time of cooking. The food items may be prepared prior to the time of cooking, and stored in refrigerator or freezer to preserve freshness. Pre-packed food items may be purchased in sealed packages. Food items may be loaded into the cooking cartridge. Food items may be prepackaged in single-use cooking cartridge.

Select supplementary cartridge loaded with supplementary contents for the meal.

Turn on the semi-automatic food cooking apparatus.

Open cooking cartridge loading tray and insert a cooking cartridge.

Open the supplementary cartridge loading tray and insert optional supplementary cartridges.

Close the cooking cartridge loading tray and supplementary cartridge loading tray.

Choose preset or set cooking program to control "cooking cycle". Cooking programs may be entered locally and manually through control and display unit of the apparatus. Alternatively, the cooking program may be loaded from an external device such as smart phone, smart tablet, or computer (collectively referred as "external device"). The cooking programs may be stored in servers to be downloaded by external devices. The external device may be connected to the apparatus through either a wired or wireless connection. A code reader may read a code printed on the supplementary cartridge and cooking cartridge to preset the cooking program.

Modify the cooking program to suit personal preference.

Press start button on the apparatus or external device to initiate the "cooking cycle."

When the cooking cycle is complete, remove and discard the optional supplementary cartridges, take out the cooking cartridge for consumption. The cooking cartridge may be put into an optional cartridge holder to prevent heat burns. The apparatus is automatically turned off.

Cooking Cycle

In one example embodiment, there is provided a unique method of semi-automatic food cooking with a programmable "cooking cycle" that controls the following optional operations:

Put movable press in "ready" position.
Put movable press in "press" position.
Put movable press in "lift" position.
Turn on the vibrator of the movable press.
Turn off the vibrator of the movable press.

Turn on the vibrator of the movable cooking base.

Turn off the vibrator of the movable cooking base.

Turn on supplementary cartridge cap opener to pull open supplementary cartridge cap.

Turn off supplementary cartridge cap opener.

Turn on the vibrator of the supplementary cartridge loading compartment.

Turn off the vibrator of the supplementary cartridge loading compartment.

Open clean water valve to drop water into the cooking cartridge.

Close clean water valve.

Turn on cartridge drain seal opener to drain water from the cooking cartridge

Turn off cartridge drain seal opener.

Turn on the heating element to a set temperature.

Turn off the heating element.

Turn on ventilation fan.

Turn off ventilation fan.

The cooking cycle commands the above operations in a certain sequence and timing to achieve one or more of the following optional actions:

Put water into the cooking cartridge when it's needed for cooking, soaking, or rinsing.

Drain water from the cooking cartridge.

Add supplementary contents to the cooking cartridge.

Heat the food contents in the cooking cartridge to desired temperature and duration.

Cool down the food contents in the cooking cartridge to desired temperature and duration.

Stir the food contents in the cooking cartridge.

Example Safety Operations

The following optional operations may be part of a preferred method to ensure safety and soundness of the cooking process:

Turn off the system when smoke detector alarm is off.

Turn off heat when pressure in the cooking cartridge reaches a set level.

Turn on ventilation fan when the temperature in the cooking compartment reaches a set level.

Only move the movable press in "press" position when a cooking cartridge is inserted and in proper position.

Only move the movable press in "lift" position when a cooking cartridge lid is inserted and in proper position.

Only turn on clean water valve when a cooking cartridge is in place.

Only turn on clean water valve when clean water reservoir is not empty.

Only turn on drain water seal opener when a cooking cartridge with drain water seal is in place.

Only turn on drain water seal opener when waste water reservoir is not full.

Only turn on the heating element when a cooking cartridge is inserted.

Only turn on supplementary cartridge cap opener when a supplementary cartridge is in the socket.

Example Process

Figure 20:
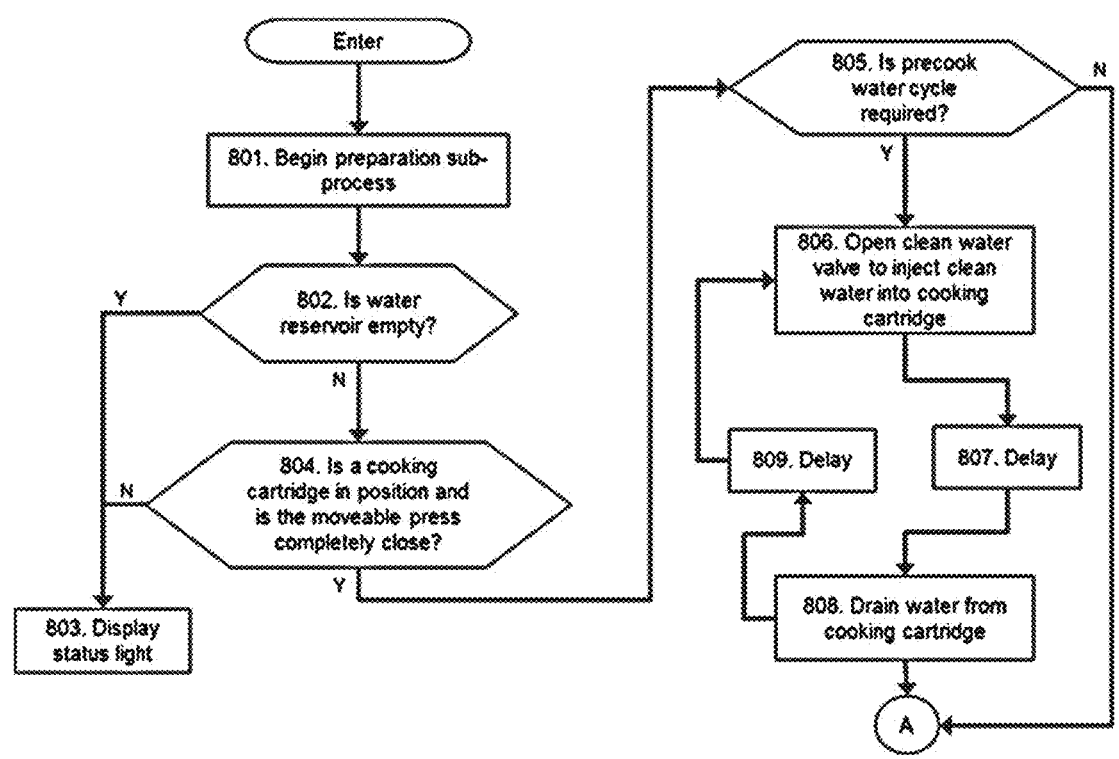
FIGS. 20 and 21 are flow diagrams illustrating a process of operating the semi-automatic food cooking apparatus of FIG. 1, in accordance with an illustrative embodiment.
Figure 21:
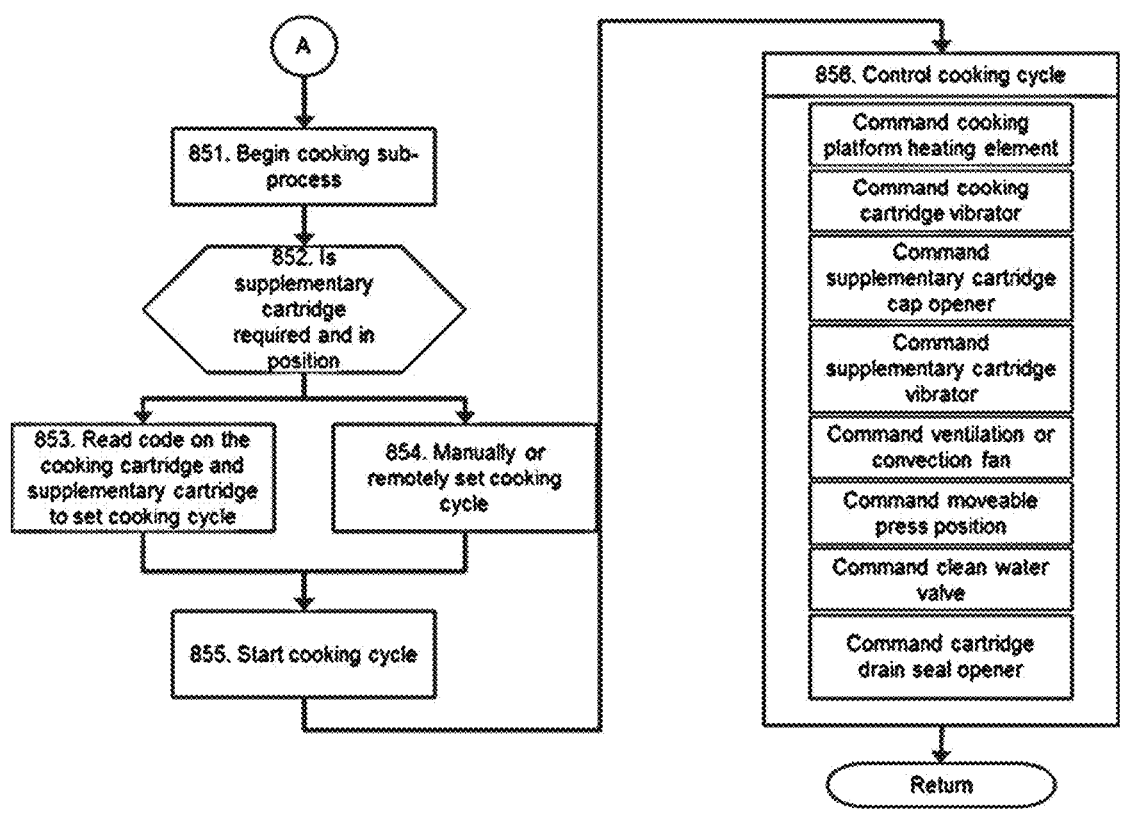

FIGS. 20 and 21 are flow diagrams illustrating a process of operating the semi-automatic food cooking apparatus of FIG. 1, in accordance with an illustrative embodiment. When initiated, the apparatus 100 begins the preparation sub-process at step 801. In subsequent steps 802 and 804, the apparatus may perform safety and soundness checks, for example water presence in the reservoir, presence and position of cooking cartridge, and position of the movable press. If the check results are negative, the apparatus 100 displays status light and information at step 803. If all checks are positive, the apparatus 100 checks if precook water cycle is required at step 805. If not, it skips ahead to step 851 to begin the cooking sub-process. If yes, the apparatus 100 turns on the clean water valve to inject water into the cooking cartridge and turns it off when the water reaches a preset quantity that matches the net volume of the cooking cartridge with loaded food items. With some time delay in step 807, the apparatus 100 turns on the drain water seal opener to drain water from the cooking cartridge. At this step 807, the vibrator may be turned on to shake the cooking cartridge for better drainage. With some time delay in step 809, the apparatus 100 may repeat steps 806 and 807 any number of time with different time delay interval. This water cycle allows rinsing, soaking, washing and cooking of food items loaded in the cooking cartridge. Once the water cycle is complete, the process advances to cooking sub-process. The apparatus 100 starts the cooking sub-process at step 851. The apparatus 100 may perform additional safety and soundness checks, for example the need for, presence and position of a supplementary cartridge. At step 852, the apparatus may read code from the supplementary cartridge and cooking cartridge to set a cooking program that controls the "cooking cycle". Alternatively, the apparatus 100 may acquire a cooking program manually or remotely entered at step 854. Once the cooking program is set, the apparatus 100 start the "cooking cycle" at step 855. During the cooking cycle illustrated by step 856, the apparatus 100 operates and commands the following devices: cooking platform heating element, cooking cartridge vibrator, supplementary cartridge cap opener, supplementary cartridge vibrator, ventilation fan, movable press position, clean water valve, and drain water seal opener. In some instances, the cooking cycle may not include a heating step, for instance in the preparation of meals not requiring heating such as salads.

When the "cooking cycle" is complete, the apparatus 100 may display a message or emit a sound. The sound and message may be provided locally on the apparatus 100 or remotely on external devices.

Example 1: Penne Parmesan Alfredo

To cook this meal, a user of apparatus 100 places one serving quantity of penne pasta into the cooking cartridge 501. Alternatively, the user purchases a commercially available penne pasta package measured for the required quantify and loads the pre-packaged penne pasta into the cooking cartridge 501. In a further alternative, the user purchases a preloaded single-use-penne-pasta cooking cartridge 501. The user chooses two supplementary cartridges 701 for the supplementary cartridge compartment 103. The first supplementary cartridge may contain a premixed sauce that may have parmesan, minced onion, garlic, peas, salt, pepper and heavy cream. The second supplementary cartridge may contain grated parmesan. The supplementary cartridges have sufficient contents for one serving.

The user turns on the apparatus 100, subsequently inserts the loaded cooking cartridge 501 through cooking loading tray 151, and supplementary cartridges 701 into the supplementary cartridge loading tray 152, then push the supplementary cartridges into the socket 201 in the supplementary cartridge compartment 103.

The user scans the code on the supplementary cartridges 701 or optionally the single-use preloaded cooking cartridge 501 with an external device. Alternatively, the apparatus 100 scans the code on the inserted supplementary cartridges 701 and optionally the single-use preloaded cooking cartridge 501 to set the matching cooking program. Alternatively, the user chooses a preset cooking program on the apparatus 100, from program library on a server, or from an external device. The selected cooking program can be loaded to the apparatus 100 by an external device. The user may modify the cooking program to suite personal preference.

The user initiates the cooking cycle. The action can be done either locally on the apparatus 100 or remotely via external device.

During a preferred cooking cycle, the apparatus 100 performs the following sequential operations:

Put the movable press 202 in "lift" position.

Turn on clean water valve (not shown) to fill water into the cooking cartridge 501.

Turn off clean water valve (not shown).

Put the movable press 202 in "press" position.

Turn on heating element on the cooking platform 281 to a set temperature.

After a certain time period, turn off the heating element on the cooking platform 281.

Turn on the drain water seal opener 285 and 286.

Intermittently, turn on vibrators 253 and 283 on the movable press 202 and the movable cooking base 203 to assist water draining.

Turn off the drain water seal opener 285 and 286.

Put the movable press 202 in "lift" position.

Turn on the supplementary cartridge opener 601 and 602 of the first socket 201.

Turn on the vibrator 603 on the first supplementary cartridge socket 201 to assist the discharge of premixed sauce into the cooking cartridge 501.

Put the movable press 202 in "press" position.

Turn on heating element on the cooking platform 281 to a set temperature.

Intermittently turn on vibrators 253 and 283 on the movable press 202 and the movable cooking base 203 to assist content mixing After a certain time period, turn off the heating element on the cooking platform 281.

Put the movable press 202 in "lift" position.

Turn on the supplementary cartridge opener 601 and 602 of the second socket 201.

Turn on the vibrator 603 on the second supplementary cartridge socket 201 to assist the discharge of grated parmesan into the cooking cartridge 501.

Put the movable press 202 in "press" position.

Turn on heating element on the cooking platform 203 to a set temperature.

Intermittently turn on vibrators 253 and 283 on the movable press 202 and the movable cooking base 203 to assist content mixing.

After a certain time period, turn off the heating element on the cooking platform 281.

Put the movable press 202 in "ready" position.

Display message or send sound to inform that the meal is ready to be served.

Example 2: Stir-Fry Teriyaki Chicken

To cook this meal, a user of apparatus 100 places one serving quantity of cut chicken into the cooking cartridge 501. Alternatively, the user opens a commercially available package containing the required quantify and loads the chicken into the cooking cartridge 501. Another alternative, the user purchases a preloaded single-use-teriyaki-chicken cooking cartridge 501. The user chooses two supplementary cartridges 701. The first supplementary cartridge may contain cooking oil. The second supplementary cartridge contains premixed teriyaki sauce that may have soy sauce, teriyaki sauce, garlic, salt, and pepper. The supplementary cartridges have sufficient contents for one serving.

The user turns on the apparatus 100, subsequently inserts the loaded cooking cartridge 501 through the cooking loading tray 151, and supplementary cartridges 701 into the supplementary cartridge loading tray 152, then pushes the supplementary cartridges into the socket 201 in the supplementary cartridge compartment 103.

The user scans the code on the supplementary cartridge 701 and optionally the single-use preloaded cooking cartridge 501 with an external device. Alternatively, the apparatus 100 scans the code on the inserted supplementary cartridges 701 and optionally the single-use preloaded cooking cartridge 501 to set the matching cooking program. Alternatively, the user chooses a preset cooking program on the apparatus 100, from program library on a server, or from an external device. The selected cooking program can be loaded into the apparatus 100 by an external device. The user may modify the cooking program to suit personal preference.

The user initiates the cooking cycle. The action may be done either locally on the apparatus 100 or remotely via external device.

During the cooking cycle, the apparatus 100 performs the following sequential operations:

Put the movable press 202 in "lift" position.

Turn on the supplementary cartridge opener 601 and 602 of the first socket 201.

Turn on the vibrator 603 on the first supplementary cartridge socket 201 to assist the discharge of cooking oil into the cooking cartridge 501.

Put the movable press 202 in "press" position.

Turn on heating element on the cooking platform 281 to a set temperature.

Intermittently, turn on vibrators 253 and 283 on the movable press 202 and the movable cooking base 203 to assist content mixing.

After a certain time period, turn off the heating element on the cooking platform 281.

Put the movable press 202 in "lift" position.

Turn on the supplementary cartridge opener 601 and 602 of the second socket 201.

Turn on the vibrator 603 on the second supplementary cartridge socket 201 to assist the discharge of pre-mixed sauce into the cooking cartridge 501.

Put the movable press 202 in "press" position.

Turn on heating element on the cooking platform 281 to a set temperature.

Intermittently turn on vibrators 253 and 283 on the movable press 202 and the movable cooking base 203 to assist content mixing.

After a certain time period, turn off the heating element on the cooking platform 281.

Put the movable press 202 in "ready" position.

Display message or emit sound to inform that the meal is ready to be served.

Example 3: Rice

To cook rice, a user of the apparatus 100 places one serving of rice grains into the cooking cartridge 501. The user turns on the apparatus 100, subsequently inserts the loaded cooking cartridge 501 through the cooking loading tray 151. The user chooses a preset cooking program on the apparatus 100, from a program library on a server, or from an external device. The selected cooking program can be loaded into the apparatus 100 by an external device. The user may modify the cooking program to suit personal preference.

The user initiates the cooking cycle. The action may be done either locally on the apparatus 100 or remotely via external device.

During the cooking cycle, the apparatus 100 performs the following sequential operations:

Run and repeat rice washing or rinsing operations.
Put the movable press 202 in "lift" position.
Turn on clean water valve (not shown) to fill water into the cooking cartridge 501.
Turn off clean water valve (not shown).
Put the movable press 202 in "press" position.
Intermittently, turn on vibrators 253 and 283 on the movable press 202 and the movable cooking base 203 to assist washing or rinsing of rice grains.
Turn on the drain water seal opener 285 and 286.
Intermittently, turn on vibrators 253 and 283 on the movable press 202 and the movable cooking base 203 to assist water draining.
Turn off the drain water seal opener 285 and 286.
Put the movable press 202 in "lift" position.
Turn on clean water valve (not shown) to fill water into the cooking cartridge 501.
Turn off clean water valve (not shown).
Put the movable press 202 in "press" position.
Turn on heating element on the cooking platform 281 to a set temperature.
After a certain time period, turn off the heating element on the cooking platform 281.
Put the movable press 202 in "ready" position.
Display message and emit sound to inform that the meal is ready to be served.

The embodiments of the invention described above are intended to be merely. exemplary; numerous variations and modifications will be apparent to those skilled in the art. All such variations and modifications are intended to be within the scope of the present invention as defined in any appended claims.

What is claimed is:

1. A method for semi-automatic food cooking, comprising:
    inserting a cooking cartridge having a cooking cartridge lid containing food items into a cooking compartment of a semi-automatic cooking apparatus, the cooking compartment comprising:
        a movable press comprising: a movable press upper part; a movable press lower part, and a first spring, where (a) the lower part comprises: a movable cooking cartridge lid holder; and (b) the first spring is connected to the upper part and lower part of the movable press and allows independent movements of the upper part and the lower part;
        a movable cooking base comprising: a movable cooking base upper part, a movable cooking base lower part, and a second spring, wherein: (a) the upper part comprises: a platform base, and a cooking platform; and (b) the second spring is coupled to the upper part and the lower part of the movable cooking base and allows for independent movements of the upper part and lower part, and
        a first vibrator coupled to at least one of the movable press and the movable cooking base;
    inserting a supplementary cartridge containing supplementary contents into a supplementary loading compartment of the semi-automatic cooking apparatus, the supplementary compartment comprising:
        a supplementary cartridge socket; and
        a second vibrator coupled to the supplementary cartridge socket;
    initiating a cooking cycle, wherein the cooking cycle comprises:
        moving the movable press into a press position so as to hold the cooking cartridge securely between the movable press and the movable cooking base and so as to hold the cooking cartridge lid on the cooking cartridge,
        moving the movable press into a lift position so as to lift the cooking cartridge lid off the cooking cartridge to open the cooking cartridge,
        while the cooking cartridge is open, opening the supplementary cartridge and discharging the supplementary contents into the cooking cartridge,
        activating the second vibrator to assist the discharge of contents from the supplementary cooking cartridge, and
        activating the first vibrator to mix the food items and supplementary contents by shaking the cooking cartridge,
        heating one or both of the group consisting of the food items and a mixture of the food items and the supplementary contents, and
        removing the cooking cartridge and the supplemental cartridge from the semi-automatic cooking apparatus at the end of the cooking cycle.

2. The method of claim 1, the cooking compartment further comprising:
    a cooking cartridge loading tray, a cooking cartridge lid guide, and a supplementary loading chute, and
    the supplementary loading compartment further comprising a supplementary cartridge loading tray, a supplementary content discharge gap, and a supplementary cartridge cap opener.

3. The method of claim 1, where the inserting the cooking cartridge comprises opening the cooking cartridge loading tray, placing the cooking cartridge on the cartridge loading tray, and closing the cooking cartridge loading tray.

4. The method of claim 1, further comprising executing a cooking program to initiate and control the cooking cycle.

5. The method of claim 2, where the inserting the supplementary cartridge comprises opening the supplementary cartridge loading tray, placing the supplementary cartridge on the supplementary cartridge loading tray and closing the supplementary cartridge loading tray.

6. The method of claim 1, where the cooking cycle comprises one or more of adding water to the cooking cartridge and draining water from the cooking cartridge.

7. The method of claim 1, further comprising one or more of adding the food items to the cooking cartridge and adding the supplementary contents to the supplementary cartridge prior to inserting the cooking cartridge into the cooking compartment.

8. The method of claim 1, where the cooking cycle further comprises activating a ventilation fan.

9. The method of claim 1, where the cooking cycle further comprises moving the cooking cartridge lid toward a back of the cooking compartment.

* * * * *